(12) United States Patent
Clark

(10) Patent No.: US 6,532,615 B2
(45) Date of Patent: Mar. 18, 2003

(54) DIRT DEFLECTOR AND STIFFENER FOR VEHICLE WASHING IMPLEMENT

(76) Inventor: G. Jack Clark, 4769 Paw Paw Lake Rd., Coloma, MI (US) 49038

( * ) Notice: Subject to any disclaimer, the term of this patent is extended or adjusted under 35 U.S.C. 154(b) by 36 days.

(21) Appl. No.: 09/816,058

(22) Filed: Mar. 23, 2001

(65) Prior Publication Data

US 2002/0174503 A1 Nov. 28, 2002

(51) Int. Cl.$^7$ ................................................ B60S 3/06
(52) U.S. Cl. .................. 15/230.12; 15/97.3; 15/DIG. 2
(58) Field of Search ................ 15/97.3, 230, 230.12, 15/230.15, 230.16, 230.17, 230.18, 230.19, DIG. 2; 451/537

(56) References Cited

U.S. PATENT DOCUMENTS

| | | | |
|---|---|---|---|
| 3,228,053 A | | 1/1966 | Horton et al. |
| 3,255,479 A | | 6/1966 | Dolan et al. |
| 4,055,028 A | * | 10/1977 | Belanger |
| 4,055,919 A | * | 11/1977 | Belanger |
| 4,377,878 A | * | 3/1983 | Pecora |
| 4,567,619 A | * | 2/1986 | Clark |
| 4,653,135 A | * | 3/1987 | Clark |
| 5,396,680 A | * | 3/1995 | Belanger |
| 5,461,745 A | * | 10/1995 | Nittoli |
| 5,884,356 A | * | 3/1999 | Zigerlig |

FOREIGN PATENT DOCUMENTS

GB         754 953         8/1956

\* cited by examiner

Primary Examiner—Terrence R. Till
(74) Attorney, Agent, or Firm—Flynn, Thiel, Boutell & Tanis, P.C.

(57) ABSTRACT

A finishing unit for a vehicle surface treatment apparatus composed of a thin sheet-like pad of material having flexible characteristics, the pad being adapted for contact with a vehicle surface. A buffer member of flexible material is also provided and opposes a surface area on the pad. A stiffening structure is oriented over a majority of the opposing surface areas of the buffer member and the pad to effect a fixed securement of the opposing surface areas together so as to provide an area of substantially less flexibility than the individual flexibility characteristic of each of the buffer member and the pad.

15 Claims, 6 Drawing Sheets

DIRT DEFLECTOR AND STIFFENER FOR VEHICLE WASHING IMPLEMENT

FIELD OF THE INVENTION

This invention relates to a finishing unit for a vehicle surface treatment apparatus and, more particularly, to an arrangement for stiffening the performance characteristic of a thin sheet-like pad of material secured to a rotating drum, the outer edges of which are adapted to engage the surface of the vehicle for facilitating a treatment thereof.

BACKGROUND OF THE INVENTION

It is common place in vehicle surface treatment apparatus to mount pads of cloth or closed-cell foam to a rotating drum to cause the distal ends of the pads to engage the surface of the vehicle to effect the appropriate treatment of the surface. When the apparatus is a vehicle surface washing apparatus, liquid, such as water, is used in conjunction with the pads and various chemicals, such as soap and the like, are mixed so that the pads will effect the appropriate cleaning of the vehicle surface. In order to prevent damage to the vehicle surface during a surface treatment procedure, it is desirable to use lighter weight material for the pads. This has been accomplished by making the pads of thin sheet-like cloth and closed-cell foam. However, as the vehicle approaches a rotating mechanism on which is mounted a plurality of such pads, the rotating drum will continue to move toward the vehicle surface as the vehicle approaches to in effect cause the surface area of the material of the pads to be dragged across the vehicle surface. It has been noted in the past that the cleaning performance characteristic of the pads is enhanced when only the distal end portion of the pads engages the vehicle surface. When cloth material is used for the pad, the liquid will be absorbed into it thereby giving it more body causing the pad to remain somewhat stiff as it is being rotated with the drum to facilitate engagement of the distal ends thereof with the vehicle surface. However, even when the material is cloth, it is generally thin and lacks the desired stiffness characteristic to prevent a major surface area of the pad from being dragged across the vehicle surface thereby lessening the cleaning ability or lessening the chance of damage to the drum as well as to the vehicle surface. Further, maintaining engagement of only the distal end portions of the pad material will enhance the lifetime of the pad.

The issue of a major surface area of the pad material being dragged across the vehicle surface becomes even more critical when a lighter weight material, such as a closed-cell foam material, is used. Foam, compared to a cloth material, has very little body or bulk and it does not absorb liquid. Thus, it lacks the requisite ability to maintain only the distal ends thereof in engagement with the vehicle surface.

Therefore, it is a desire of this invention to provide finishing units as well as a vehicle surface treatment apparatus using such finishing units wherein a stiffness characteristic is introduced into the pad material to facilitate a maintaining of the distal end portion of the pad in engagement with the vehicle surface.

SUMMARY OF THE INVENTION

The objects and purposes of the invention are met by providing a finishing unit for a vehicle surface treatment apparatus composed of a thin sheet-like pad of material having flexible characteristics, the pad being adapted for contact with a vehicle surface. A buffer member of flexible material is a thin sheet-like member having a width comparable to the width of the pad and a length substantially shorter than the length of the pad. The buffer member overlays an opposing surface of the pad. A stiffening structure is oriented over a majority of the opposing surface areas of the buffer member and the pad and effects a fixed securement of the opposing surface areas of the buffer member and the pad together so as to provide an area of substantially less flexibility than the individual flexibility characteristic of each of the buffer member and the pad.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
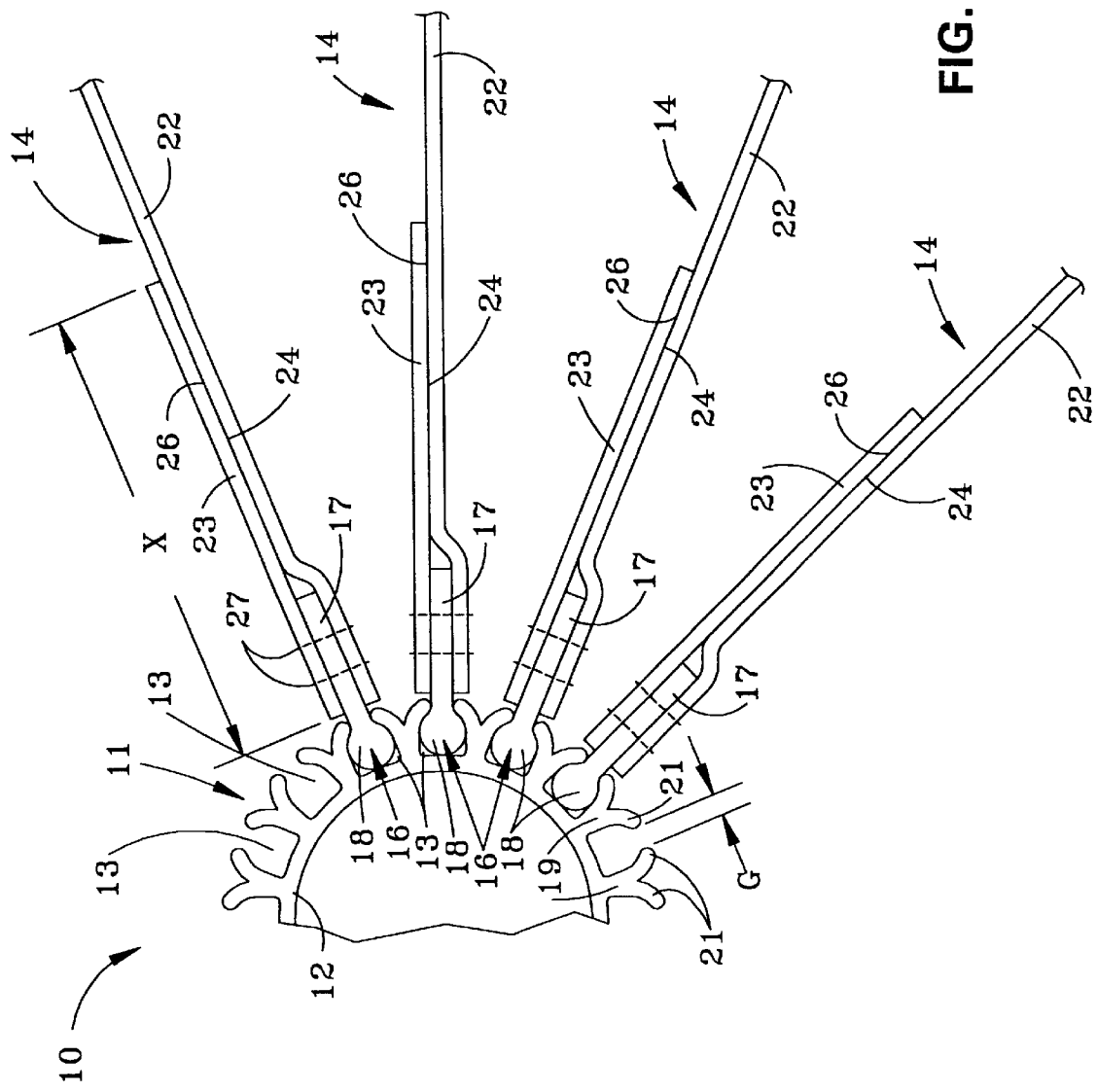
FIG. 1 is a fragmentary illustration of a top view of an elongate mounting part, such as a drum, for use in a vehicle washing apparatus, to which is attached a plurality of thin sheet-like pads adapted for treatment of a vehicle surface.

A vehicle surface treatment apparatus 10 is schematically illustrated in FIG. 1 and includes an elongate mounting part 11 consisting of a cylindrical core 12 having on the outer periphery thereof a plurality of parallel tracks or grooves 13 extending parallel to a longitudinal axis of the core. A plurality of finishing units or surface treating implements 14 are provided and are secured via an inner edge part 16 to the tracks or grooves 13 of the elongate mounting part 11. More specifically, the inner edge part 16 includes a flat planar-like portion 17 having along a radially inner edge thereof a cylindrical enlargement, the diameter of which conforms closely to the width of a base part of the track or groove 13. The track or grooves 13 are each defined by a pair of spaced side walls 19, the radially outer edges 21 of which are spaced apart a width G to define a gap through which extends the flat part 17 of the inner edge member 16. The diameter of the cylindrical enlargement 18 of the inner edge member 16 is greater than the thickness of the flat part 17 as well as the dimension of the gap G so that as the elongate mounting part 11 is rotated, the cylindrical enlargement 18 will be retained in the tracks or grooves 13.

Figure 2:
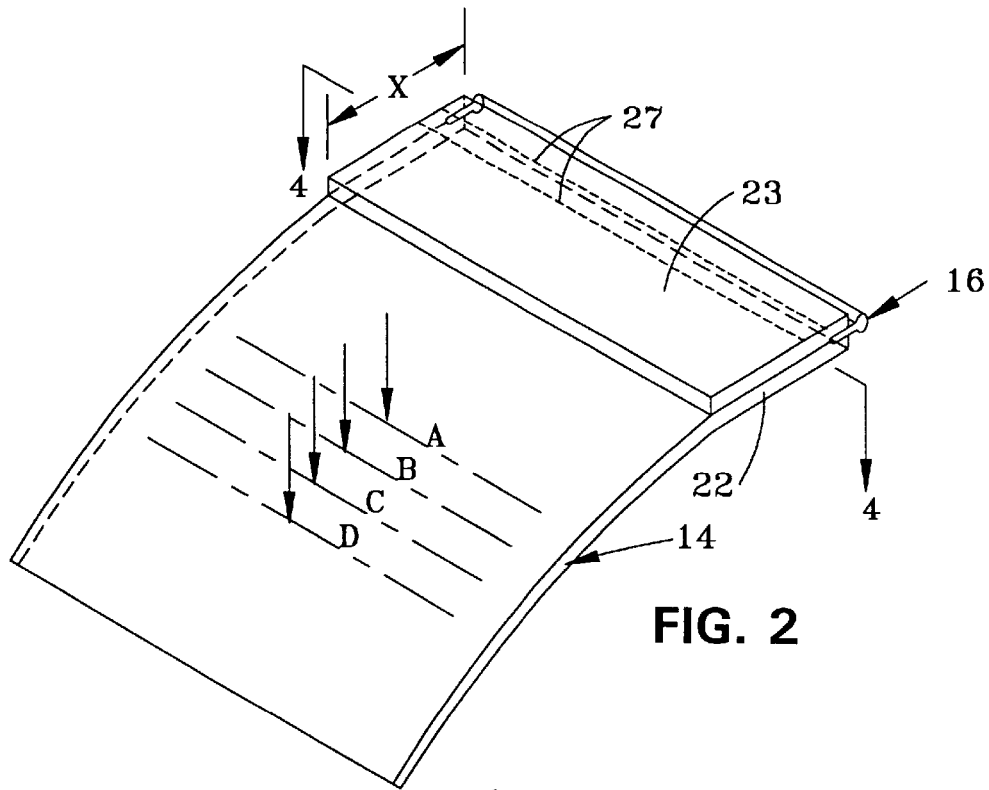
FIG. 2 is an isometric view of a pad with a buffer member mounted on the upper surface thereof.
Figure 3:
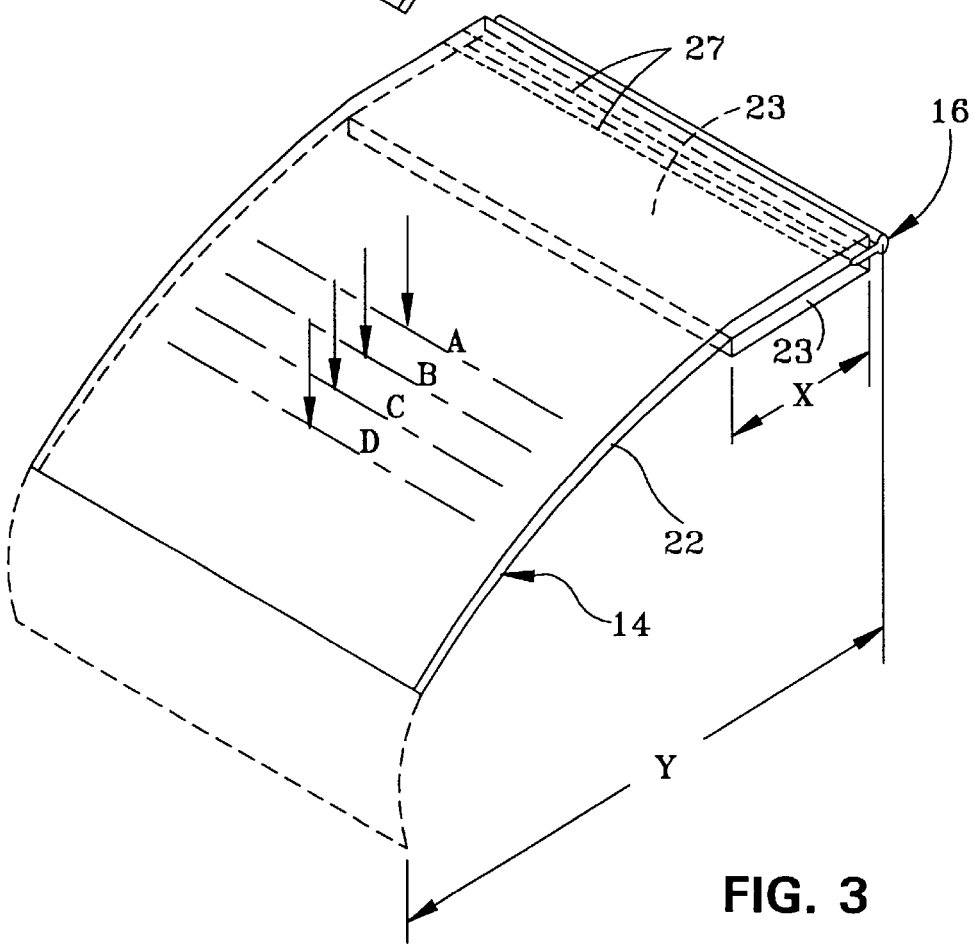
FIG. 3 is an alternate construction of a pad with the buffer member on the underside thereof.

The surface treating implements 14 are each composed of a uniformly thin sheet-like pad of material 22 having a flexible characteristic, the outer distal edge of which is adapted for contact with a vehicle surface. The pad is preferably ⅛ inches to 3/16 inches thick. The surface treating implements 14 also include a buffer member 23 also composed of a thin sheet-like material that is either the same as the material of the pad 22 or is of a different material. The buffer member 23 has a thickness and a width comparable to the thickness and width of the pad 22 and a radial length that is substantially shorter than the radial length of the pad as is illustrated in FIGS. 1–3. A substantial surface area portion 24 of the buffer member 23 is positioned to directly oppose a surface area 26 on the pad 22. The radially inner edges of the pad 22 and the buffer member 23 are secured to the flat part 17 of the inner edge member 16 as by a pair of radially spaced and preferably approximately parallel sewn seams 27 schematically illustrated in FIG. 1.

As is illustrated in FIGS. 2 and 3, the relationship of the buffer member 23 to the pad 22 can vary, that is, the buffer member 23 can be mounted on top of the pad 22 or the buffer member 23 can be mounted on the bottom side of the pad 22. It will, of course, be recognized that FIGS. 2 and 3 are simply inversely related to one another.

Figure 4:
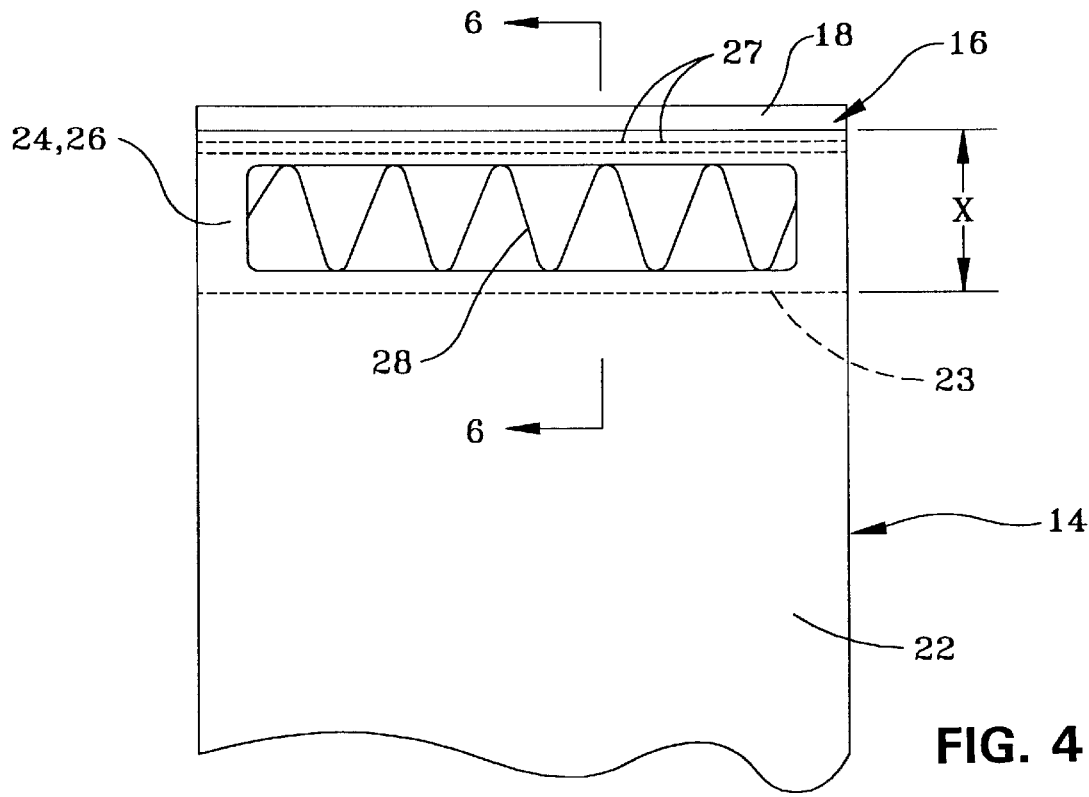
FIG. 4 is a sectional view taken along the line 4—4 of FIG. 2 prior to attachment of a buffer member to the pad.
Figure 5:
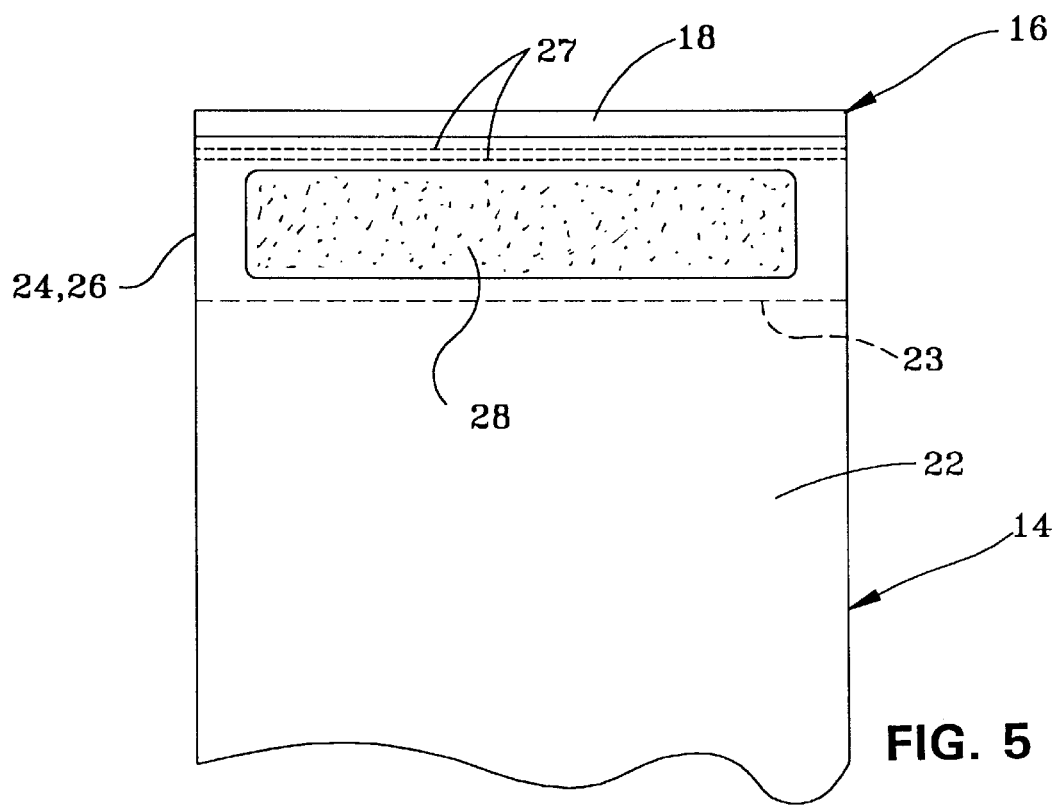
FIG. 5 is a sectional view similar to FIG. 4, but after application of the buffer member to the pad.

During assembly, and referring to FIGS. 4 and 5, and after the sewn seams 27 have effected a securement of the pad 22 and the buffer member 23 to the flat part 17 of the inner edge member 16, either the buffer member 23 is lifted as in FIG. 2 or the pad 22 is lifted as in FIG. 3 relative to the other member so that an adhesive bead 28 can be applied to the appropriate bottom member of the stacked array, namely, to the appropriate surface area 24 or 26. In this particular embodiment, the adhesive is a hot melt adhesive applied by a hand-held adhesive applicator tool (not illustrated) adjusted to dispense a ⅛ inch diameter continuous flow of adhesive to the aforesaid appropriate surface area 24, 26. In this particular embodiment, the adhesive bead is first applied to define a rectangle spaced inwardly of the boundary of the opposing surface areas 24, 26 by approximately ½ inch to ¾ inch from the edge and thereafter a sinusoidal wave pattern is created in the interior of the so-formed rectangle. It is important that the sinusoidal pattern extend toward and away from the inner edge of the pad 22, namely, toward and away from the cylindrical enlarge 18 of the inner edge member 16 so that radially oriented ribs of the sinusoidal pattern and the rectangle pattern will be formed by the adhesive. Thereafter, the appropriate one of the pad 22 and the buffer member 23 is laid down onto the uncured adhesive and a pressure is applied so as to squeeze the adhesive into an essentially uniform pattern as is schematically illustrated in FIG. 5 so that the adhesive 28, when cured, will provide a greater strength characteristic and resistance to flexing of the material of the buffer member 23 and the pad 22. It is important that the adhesive not squeeze out from between the material of the pad 22 and the material of the buffer member 23.

In this particular embodiment, the hot melt adhesive is a water resistant type SP100 having a recommended application temperature of 300° F. to 350° F. and is available from On-Hand Adhesives, Inc. in Mt. Prospect, Ill.

Figure 6:
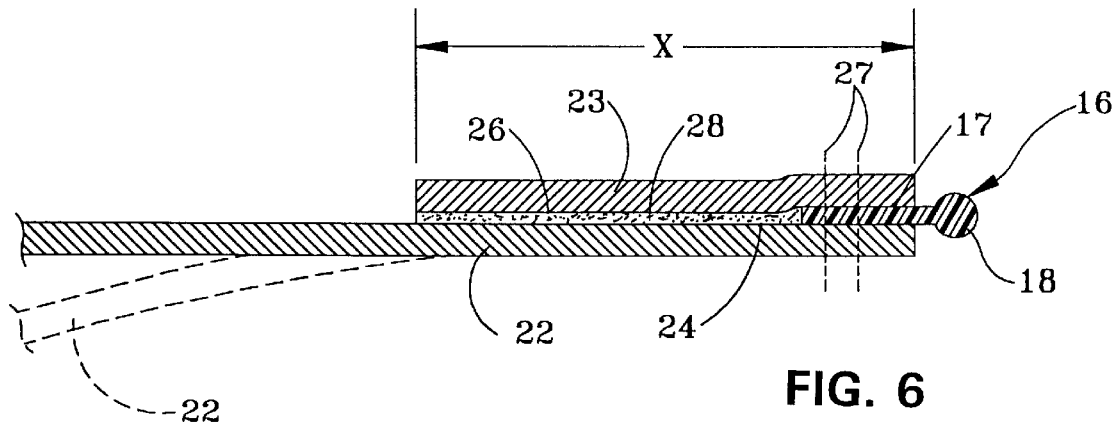
FIG. 6 is a sectional view taken along the line 6—6 of FIG. 4.
Figure 7:
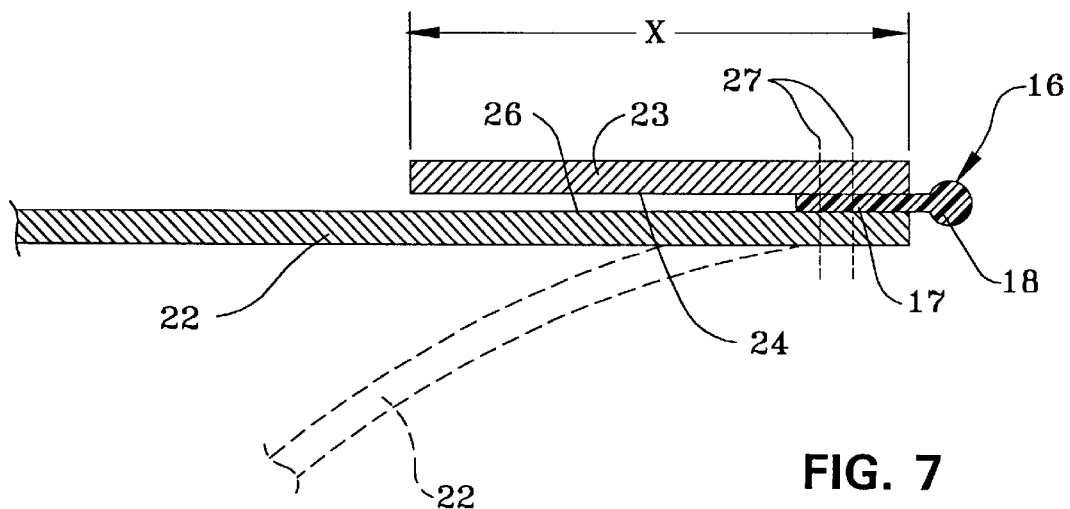
FIG. 7 is a sectional view similar to FIG. 6, but without the pad being secured to the buffer member over a majority of the opposing surface areas thereof.

In order to establish the benefits derived by the aforesaid construction, a comparison study was conducted comparing the features of a construction such as is illustrated in FIG. 6 with a construction as is illustrated in FIG. 7, that is, the latter construction having no securement of the opposing surface areas 24 and 26 to each other. More specifically, the constructions illustrated also in FIGS. 2 and 3 were subjected to a comparison testing both with an adhesive 28 oriented between the opposing surface areas 24 and 26 as well as with no adhesive between them. A testing fixture, such as is illustrated in FIG. 8, was utilized in order to make this comparative testing.

Figure 8:
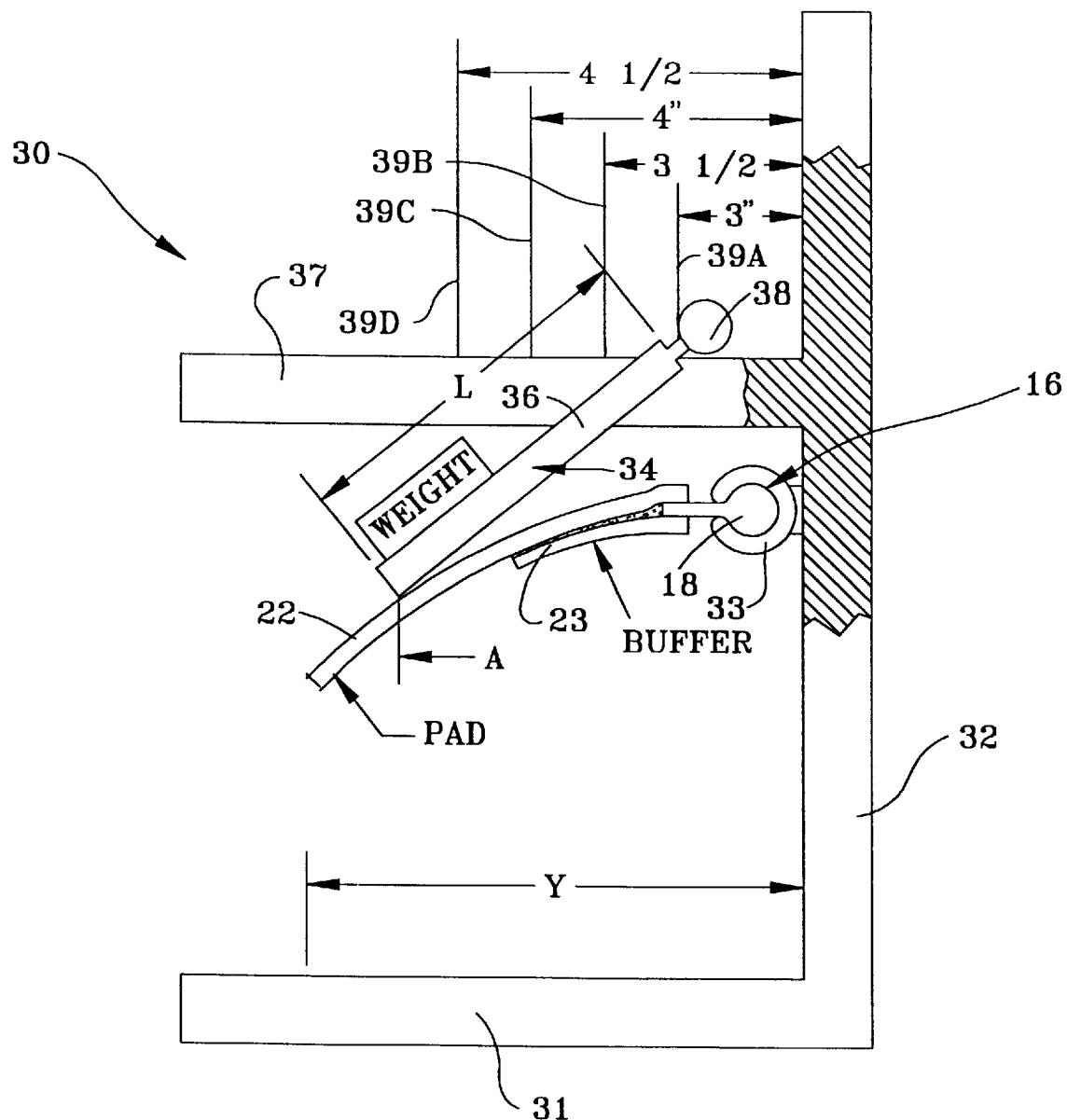
FIG. 8 is a side view of a test stand fixture for measuring the stiffness characteristic of alternate versions of the pad/buffer member combination.

Referring to FIG. 8, a test stand 30 is there illustrated and includes a base platform 31 having along one edge thereof an upstanding wall 32. Midway up the wall 32 there is provided a track member 33 secured to the wall 32. The configuration of the track 33 is generally the same as the track or groove 13 in the elongate mounting part 11 illustrated in FIG. 1. The cylindrical enlargement 18 of the inner edge member 16 is adapted to be received in the track 33 so that the pad 22 and the associated buffer member 23 extend away therefrom, leftwardly as illustrated in FIG. 8. The buffer member 23 has a radial dimension X and a width corresponding to the width of the pad 22. The pad 22 has a radial length greater than the X dimension of the buffer. In this particular embodiment, the radial length of the pad 22 in all tests was 20 inches and the lateral width of the pad was in every instance 14 inches. The radial dimension X of the buffer member 23 included three varieties, namely, a variety where the radial dimension X was 4 inches, 6 inches and 8 inches, respectively.

A pivotal weight applying member 34 is utilized to apply a weight at four differing locations A, B, C, D as illustrated in FIGS. 2 and 3 to the pad 22. The pivotal weight applying member 34 consists of a flat plate 36 having a radial dimension L of 9 inches and a lateral width of 18 inches. A pair of laterally spaced support arms 37 extend outwardly from the wall 32 above the track 33 to form a gap adapted to receive the 18 inch dimension of the pivotal weight applying member 34 therein. The radially inner edge of the weight applying member 34 has a pivot member 38 composed of an elongate rod, opposite ends of which are adapted to rest on the upper surface of each of the support arms. A plurality of spaced upright projections 39A, 39B, 39C and 39D project upwardly from each of the support arms 37. In the test stand 30 illustrated in FIG. 8, the two upstanding projections 39A are each oriented 3 inches out from the wall 32. The two upstanding projections 39B are each oriented 3½ inches out from the wall 32. The two upstanding projections 39C are each oriented 4 inches out from the wall 32 and the two upstanding projections 39D are each oriented 4½ inches from the wall 32. The rod 38 is adapted to be selectively oriented between the wall 32 and a selected one of the upstanding projections for each force application. As is shown in FIG. 8, the rod 38 is oriented adjacent and touching the upstanding projections 39A 3 inches out from the wall 32 to apply a load to the upper surface of the pad 22 at location A. When the rod is oriented adjacent the upstanding projections 39B, the pivotal weight applying member 34 will apply a weight at location B to the pad 22. Similar weight applications will occur at locations C and D when the rod 38 is oriented against the upstanding projections 39C and 39D, respectively. When the weight is applied to the pad 22, the amount of deflection is measured by the distance Y between the wall 32 and the distal end of the pad 22. The following data was recorded based on these tests.

CHART 1

DRY CLOTH
2 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 4⅛" | 4¾" | 4½" | 4½" |
| X = 4" BUFFER - W/ADHESIVE BUFFER ON TOP | 6¾" | 7¾" | 7½" | 6¾" |
| X = 6" BUFFER - NO ADHESIVE BUFFER ON TOP | 4¼" | 4¾" | 4¾" | 5" |
| X = 6" BUFFER - W/ADHESIVE BUFFER ON TOP | 9" | 9" | 9¼" | 9½" |
| X = 8" BUFFER - NO ADHESIVE BUFFER ON TOP | 4" | 4½" | 5¼" | 5" |
| X = 8" BUFFER - W/ADHESIVE BUFFER ON TOP | 9½" | 9¼" | 10" | 9¼" |
| X = 4" BUFFER - NO ADHESIVE BUFFER UNDERNEATH | 9½" | 9" | 10" | 10" |
| X = 4" BUFFER - W/ADHESIVE BUFFER UNDERNEATH | 12¼" | 11½" | 11½" | 11¼" |
| X = 6" BUFFER - NO ADHESIVE BUFFER UNDERNEATH | 10" | 9" | 10" | 10" |
| X = 6" BUFFER - W/ADHESIVE BUFFER UNDERNEATH | 12" | 12" | 12½" | 12" |
| X = 8" BUFFER - NO ADHESIVE BUFFER UNDERNEATH | 10¼" | 10¼" | 10¾" | 11½" |
| X = 8" BUFFER - W/ADHESIVE BUFFER UNDERNEATH | 14¾" | 14½" | 14" | 14¼" |

CHART 2

DRY CLOTH
3 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 3¾" | 4" | 5" | 5" |
| X = 4" BUFFER - W/ADHESIVE BUFFER ON TOP | 7½" | 7¼" | 6" | 6" |
| X = 6" BUFFER - NO ADHESIVE BUFFER ON TOP | 4" | 5" | 4½" | 5" |
| X = 6" BUFFER - W/ADHESIVE BUFFER ON TOP | 8" | 8" | 8" | 8" |
| X = 8" BUFFER - NO ADHESIVE BUFFER ON TOP | 4½" | 4¼" | 4½" | 5½" |
| X = 8" BUFFER - W/ADHESIVE BUFFER ON TOP | 8" | 7½" | 7¾" | 7¼" |
| X = 4" BUFFER - NO ADHESIVE BUFFER UNDERNEATH | 8" | 8" | 8¼" | 8" |
| X = 4" BUFFER - W/ADHESIVE BUFFER UNDERNEATH | 11½" | 10¼" | 10½" | 10" |
| X = 6" BUFFER - NO ADHESIVE BUFFER UNDERNEATH | 8¼" | 8¼" | 8" | 8" |
| X = 6" BUFFER - W/ADHESIVE BUFFER UNDERNEATH | 12" | 11¼" | 10¾" | 10½" |
| X = 8" BUFFER - NO ADHESIVE BUFFER UNDERNEATH | 9" | 8½" | 8¼" | 9¼" |
| X = 8" BUFFER - W/ADHESIVE BUFFER UNDERNEATH | 13¼" | 12½" | 12" | 12" |

CHART 3

DRY CLOTH
4 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 3¾" | 3¾" | 4" | 4½" |
| X = 4" BUFFER - W/ADHESIVE BUFFER ON TOP | 7" | 6" | 5¾" | 5½" |
| X = 6" BUFFER - NO ADHESIVE BUFFER ON TOP | 3" | 3" | 4" | 4" |
| X = 6" BUFFER - W/ADHESIVE BUFFER ON TOP | 7" | 6¼" | 7" | 7" |
| X = 8" BUFFER - NO ADHESIVE BUFFER ON TOP | 3½" | 3" | 3½" | 4½" |
| X = 8" BUFFER - W/ADHESIVE BUFFER ON TOP | 6" | 6" | 6" | 7" |
| X = 4" BUFFER - NO ADHESIVE BUFFER UNDERNEATH | 7" | 6" | 6" | 6¼" |
| X = 4" BUFFER - W/ADHESIVE BUFFER UNDERNEATH | 10½" | 10" | 9" | 9" |
| X = 6" BUFFER - NO ADHESIVE BUFFER UNDERNEATH | 7" | 7" | 5½" | 6½" |
| X = 6" BUFFER - W/ADHESIVE BUFFER UNDERNEATH | 11" | 10" | 10" | 10" |
| X = 8" BUFFER - NO ADHESIVE BUFFER UNDERNEATH | 7½" | 7½" | 7½" | 8" |
| X = 8" BUFFER - W/ADHESIVE BUFFER UNDERNEATH | 11¼" | 10½" | 11" | 10½" |

CHART 4

WET CLOTH
2 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 1¾" | 2" | 2" | 2" |
| X = 4" BUFFER - W/ADHESIVE BUFFER ON TOP | 4" | 5" | 5" | 4½" |
| X = 6" BUFFER - NO ADHESIVE BUFFER ON TOP | 1½" | 2" | 2" | 2" |
| X = 6" BUFFER - W/ADHESIVE BUFFER ON TOP | 5" | 5¼" | 5¾" | 6" |
| X = 8" BUFFER - NO ADHESIVE BUFFER ON TOP | 2" | 2½" | 3" | 2½" |
| X = 8" BUFFER - W/ADHESIVE BUFFER ON TOP | 5¼" | 5" | 5½" | 5¾" |
| X = 4" BUFFER - NO ADHESIVE BUFFER UNDERNEATH | 4¾" | 5" | 5" | 4¾" |
| X = 4" BUFFER - W/ADHESIVE BUFFER UNDERNEATH | 7" | 7½" | 7¾" | 7" |
| X = 6" BUFFER - NO ADHESIVE BUFFER UNDERNEATH | 5½" | 5" | 5" | 4¾" |
| X = 6" BUFFER - W/ADHESIVE BUFFER UNDERNEATH | 7¾" | 7¾" | 8" | 7¾" |
| X = 8" BUFFER - NO ADHESIVE BUFFER UNDERNEATH | 6" | 7" | 7" | 5⅜" |
| X = 8" BUFFER - W/ADHESIVE BUFFER UNDERNEATH | 9" | 8¾" | 9¼" | 8½" |

CHART 5

WET CLOTH
3 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 2" | 2" | 2¼" | 2" |
| X = 4" BUFFER - W/ADHESIVE BUFFER ON TOP | 4½" | 4¾" | 5" | 4¾" |
| X = 6" BUFFER - NO ADHESIVE BUFFER ON TOP | 2¼" | 2" | 2" | 2" |
| X = 6" BUFFER - W/ADHESIVE BUFFER ON TOP | 5" | 5¼" | 5" | 5½" |
| X = 8" BUFFER - NO ADHESIVE BUFFER ON TOP | 3" | 2¼" | 2¾" | 3" |
| X = 8" BUFFER - W/ADHESIVE BUFFER ON TOP | 5" | 4½" | 5¼" | 5¼" |
| X = 4" BUFFER - NO ADHESIVE BUFFER UNDERNEATH | 4¼" | 5" | 5" | 5¼" |
| X = 4" BUFFER - W/ADHESIVE BUFFER UNDERNEATH | 6¼" | 6¾" | 6¾" | 6½" |
| X = 6" BUFFER - NO ADHESIVE BUFFER UNDERNEATH | 4¾" | 5" | 5" | 5" |
| X = 6" BUFFER - W/ADHESIVE BUFFER UNDERNEATH | 7" | 7½" | 7¼" | 7½" |
| X = 8" BUFFER - NO ADHESIVE BUFFER UNDERNEATH | 5¼" | 6" | 6" | 6" |
| X = 8" BUFFER - W/ADHESIVE BUFFER UNDERNEATH | 7¾" | 7½" | 7¾" | 8" |

CHART 6

WET CLOTH
4 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 2½" | 2¼" | 2¼" | 2¼" |
| X = 4" BUFFER - W/ADHESIVE BUFFER ON TOP | 4¼" | 4½" | 4¾" | 4½" |
| X = 6" BUFFER - NO ADHESIVE BUFFER ON TOP | 2¼" | 2¼" | 2" | 2" |
| X = 6" BUFFER - W/ADHESIVE BUFFER ON TOP | 4½" | 4¾" | 4¾" | 4¾" |
| X = 8" BUFFER - NO ADHESIVE BUFFER ON TOP | 2½" | 2¾" | 2½" | 3" |
| X = 8" BUFFER - W/ADHESIVE BUFFER ON TOP | 4½" | 4½" | 4½" | 5" |
| X = 4" BUFFER - NO ADHESIVE BUFFER UNDERNEATH | 4¼" | 4¾" | 4½" | 5¼" |
| X = 4" BUFFER - W/ADHESIVE BUFFER UNDERNEATH | 6¼" | 6½" | 6½" | 6¾" |
| X = 6" BUFFER - NO ADHESIVE BUFFER UNDERNEATH | 4¾" | 5" | 5¼" | 5½" |
| X = 6" BUFFER - W/ADHESIVE BUFFER UNDERNEATH | 7¼" | 7" | 7½" | 7¾" |
| X = 8" BUFFER - NO ADHESIVE BUFFER UNDERNEATH | 5½" | 5¾" | 5¾" | 6½" |
| X = 8" BUFFER - W/ADHESIVE BUFFER UNDERNEATH | 7¾" | 7¾" | 8" | 8" |

CHART 7

FOAM
2 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 4½" | 4½" | 4½" | 4½" |
| X = 4" BUFFER - W/ADHESIVE BUFFER ON TOP | 6½" | 6½" | 6¼" | 5¾" |
| X = 6" BUFFER - NO ADHESIVE BUFFER ON TOP | 4¼" | 4¼" | 4½" | 4" |
| X = 6" BUFFER - W/ADHESIVE BUFFER ON TOP | 9½" | 9¾" | 9⅝" | 9¾" |
| X = 8" BUFFER - NO ADHESIVE BUFFER ON TOP | 4½" | 4½" | 4½" | 4½" |
| X = 8" BUFFER - W/ADHESIVE BUFFER ON TOP | 10" | 10" | 9½" | 9½" |
| X = 4" BUFFER - NO ADHESIVE BUFFER UNDERNEATH | 5" | 5" | 4½" | 6" |
| X = 4" BUFFER - W/ADHESIVE BUFFER UNDERNEATH | 8⅝" | 8½" | 8¼" | 8" |
| X = 6" BUFFER - NO ADHESIVE BUFFER UNDERNEATH | 5" | 5⅛" | 5½" | 6½" |
| X = 6" BUFFER - W/ADHESIVE BUFFER UNDERNEATH | 9¼" | 9¼" | 9¼" | 9" |
| X = 8" BUFFER - NO ADHESIVE BUFFER UNDERNEATH | 4½" | 4¾" | 5½" | 6" |
| X = 8" BUFFER - W/ADHESIVE BUFFER UNDERNEATH | 9¼" | 9¼" | 9½" | 9¼" |

CHART 8

FOAM
3 LB. WEIGHT PIVOTED TO LAY ONTO MATERIAL OF PAD

| | MEASURED DISTANCE "Y" AT POSITIONS | | | |
|---|---|---|---|---|
| | A | B | C | D |
| X = 4" BUFFER - NO ADHESIVE BUFFER ON TOP | 3¼" | 4" | 4¼" | 4¼" |
| X = 4" BUFFER - W/ADHESIVE BUFFER ON TOP | 6" | 6" | 5½" | 5" |
| X = 6" BUFFER - NO ADHESIVE BUFFER ON TOP | 3" | 3¼" | 4¼" | 4" |
| X = 6" BUFFER - W/ADHESIVE BUFFER ON TOP | 8" | 8¼" | 7¾" | 8" |
| X = 8" BUFFER - NO ADHESIVE BUFFER ON TOP | 3¾" | 3½" | 3½" | 4½" |
| X = 8" BUFFER - W/ADHESIVE BUFFER ON TOP | 8¾" | 8" | 7½" | 7½" |
| X = 4" BUFFER - NO ADHESIVE BUFFER UNDERNEATH | 4¼" | 4½" | 5" | 5" |
| X = 4" BUFFER - W/ADHESIVE BUFFER UNDERNEATH | 7" | 7¾" | 7" | 7" |
| X = 6" BUFFER - NO ADHESIVE BUFFER UNDERNEATH | 4¼" | 4½" | 5¼" | 5½" |
| X = 6" BUFFER - W/ADHESIVE BUFFER UNDERNEATH | 7¾" | 8" | 8" | 8" |
| X = 8" BUFFER - NO ADHESIVE BUFFER UNDERNEATH | 3¾" | 4" | 4¾" | 5¼" |
| X = 8" BUFFER - W/ADHESIVE BUFFER UNDERNEATH | 7¼" | 7½" | 7½" | 7¾" |

CHART 9

FOAM
4 LB. WEIGHT PIVOTED TO LAY ONTO MATERIAL OF PAD

|  | MEASURED DISTANCE "Y" AT POSITIONS | | | |
| --- | --- | --- | --- | --- |
|  | A | B | C | D |
| X = 4" BUFFER - NO ADHESIVE BUFFER ON TOP | 3½" | 3½" | 4" | 4" |
| X = 4" BUFFER - W/ADHESIVE BUFFER ON TOP | 5⅞" | 5½" | 5½" | 5" |
| X = 6" BUFFER - NO ADHESIVE BUFFER ON TOP | 3¼" | 3¼" | 4" | 4½" |
| X = 6" BUFFER - W/ADHESIVE BUFFER ON TOP | 7½" | 7" | 7⅜" | 7¾" |
| X = 8" BUFFER - NO ADHESIVE BUFFER ON TOP | 3" | 3¾" | 4" | 4¼" |
| X = 8" BUFFER - W/ADHESIVE BUFFER ON TOP | 8" | 7¼" | 6¾" | 6½" |
| X = 4" BUFFER - NO ADHESIVE BUFFER UNDERNEATH | 3½" | 3¾" | 4¼" | 4¾" |
| X = 4" BUFFER - W/ADHESIVE BUFFER UNDERNEATH | 7" | 7" | 6¾" | 6¼" |
| X = 6" BUFFER - NO ADHESIVE BUFFER UNDERNEATH | 3¾" | 4" | 4½" | 4¾" |
| X = 6" BUFFER - W/ADHESIVE BUFFER UNDERNEATH | 7⅝" | 7½" | 7¼" | 7½" |
| X = 8" BUFFER - NO ADHESIVE BUFFER UNDERNEATH | 3¼" | 4" | 4" | 4½" |
| X = 8" BUFFER - W/ADHESIVE BUFFER UNDERNEATH | 7" | 6½" | 6¾" | 7" |

The above data reveals an improved stiffness characteristic when an adhesive exists at the opposing surface areas 24, 26 between the pad and buffer member. of particular interest is that some installations require the drum to rotate periodically in opposite directions. This will cause the buffer member 23 to lead the pad in one direction of rotation and trail the pad in the opposite direction of rotation. If foam is the material of pad, Charts 7, 8 and 9 reveal an approximate uniformity in stiffness characteristic in opposite orientations of the buffer member relative to the pad 22.

Figure 9:
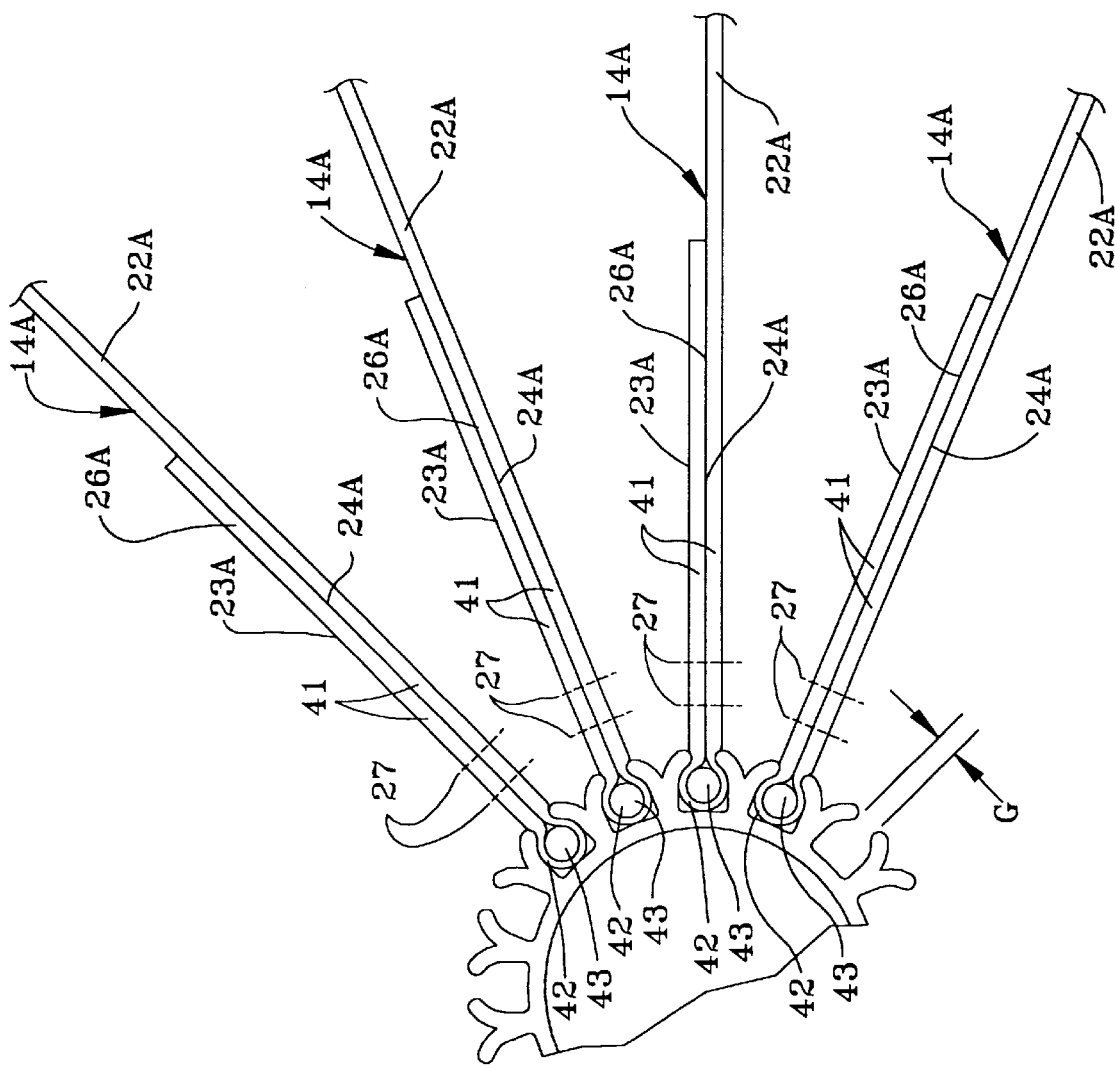
FIG. 9 illustrates an alternate construction for securing the finishing units to the core.

In an alternate arrangement shown in FIG. 9, the pad 22A and the buffer member 23A are of a unitary construction, that is, formed from the same piece of material 41. A loop 42 is formed into the unitary construction and at least one, preferably two parallel sewn seams 27A, identical to the sewn seams 27, are provided. As with the previous embodiment, an adhesive is applied between the opposed surface areas 24A, 26A of the pad 22A and the buffer member 23A in the same manner as has been described above.

During assembly of a finishing unit or surface treating element 14A, the loop 42 is oriented into a selected track or groove 13 of the core 12 and an elongate rod 43 placed inside the loop. The rod 43 has a diameter greater than the width of the gap G to effect a holding of the finishing unit 14A to the core 12 as the core is rotated.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A finishing unit for a vehicle surface treatment apparatus, comprising:
   a thin sheet-like pad of material having flexible characteristics, said pad being adapted for contact with a vehicle surface and having a first length which terminates in an outer free edge, said pad also including an inner edge part adapted for attachment to a support on said vehicle surface treatment apparatus;
   a buffer member of flexible material having a thin sheet-like characteristic with a width comparable to a width of said pad and a length, said buffer member having a segment of a length substantially shorter than said length of said pad and directly overlaying an opposing surface area of said pad;
   a stiffening structure oriented over a majority of said opposing surface areas of said buffer member and said pad and fixedly securing said opposing surface areas of said buffer member and said pad to one another to provide an area of substantially less flexibility than the individual flexibility characteristic of each of said buffer member and said pad.

2. The finishing unit according to claim 1, wherein said stiffening structure is a water resistant adhesive uniformly applied over a majority of said opposing surface areas.

3. The finishing unit according to claim 2, wherein said adhesive, when cured, fixes said opposing surfaces together so that there is little to no relative movement therebetween.

4. The finishing unit according to claim 1, wherein said material of said pad has a water absorbent characteristic.

5. The finishing unit according to claim 1, wherein said material of said pad is a closed-cell foam rendering it unable to absorb water.

6. The finishing unit according to claim 1, wherein said buffer member and said pad are made of the same material.

7. The finishing unit according to claim 6, wherein said material has a water absorbent characteristic.

8. The finishing unit according to claim 6, wherein said material is a closed-cell foam rendering it unable to absorb water.

9. The finishing unit according to claim 1, wherein said buffer member and said pad are directly fixedly secured to each other at said opposing surface areas thereof.

10. The finishing unit according to claim 1, wherein said pad and said buffer member are of a unitary construction.

11. The finishing unit according to claim 1, wherein said pad and said buffer member are fixedly fastened to an inner edge member having a flat part and an enlargement.

12. The finishing unit according to claim 11, wherein said pad and said buffer member are fixedly secured to said flat part.

13. A vehicle surface treating apparatus, comprising:
    a drum supported for rotary movement about an axis of rotation, said drum having a plurality of elongate grooves on a peripheral surface thereof extending parallel to said axis of rotation;
    a plurality of finishing units, at least some finishing units comprising a thin sheet-like pad of material having flexible characteristics, said pad being adapted for contact with a vehicle surface and having a length which terminates in an outer free edge, said pad also including an inner edge part secured to one side thereof adjacent an inner free edge remote from said outer free edge and having an elongate mounting part adapted for attachment to a support on said vehicle surface treating apparatus;
    a buffer member of flexible material secured to said inner edge part on a side thereof remote from said pad, said buffer member having a thin sheet-like characteristic with a width comparable to a width of said pad and a length, said buffer member having a segment of a length substantially shorter than said length of said pad and directly overlaying an opposing surface area of said pad;

a stiffening structure oriented over a majority of said opposing surface areas of said buffer member and said pad and fixedly securing said opposing surface areas of said buffer member and said pad to one another to provide an area of substantially less flexibility than the individual flexibility characteristic of each of said buffer member and said pad;

whereby as said drum rotates, each of said finishing units will extend radially outwardly away from said drum and exhibit a greater resistance to flexing as said drum approaches said vehicle surface than a finishing unit without a stiffening structure.

14. The vehicle surface treating apparatus according to claim 13, wherein said drum is supported for rotation in opposite directions, and wherein said stiffening structure effects a near uniform resistance to flexing in either direction of rotation.

15. The vehicle surface treating apparatus according to claim 14, wherein said pad of material is a closed-cell foam.

* * * * *